Nov. 5, 1946.　　　N. H. JURAN　　　2,410,447
SKETCHING DEVICE
Filed Oct. 30, 1944　　　3 Sheets-Sheet 1

Inventor
Nathan H. Juran

Nov. 5, 1946.   N. H. JURAN   2,410,447
SKETCHING DEVICE
Filed Oct. 30, 1944   3 Sheets-Sheet 2
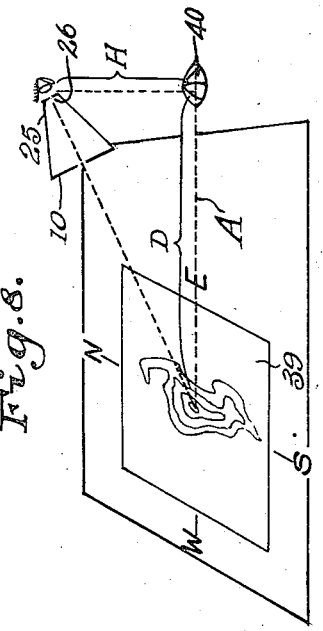
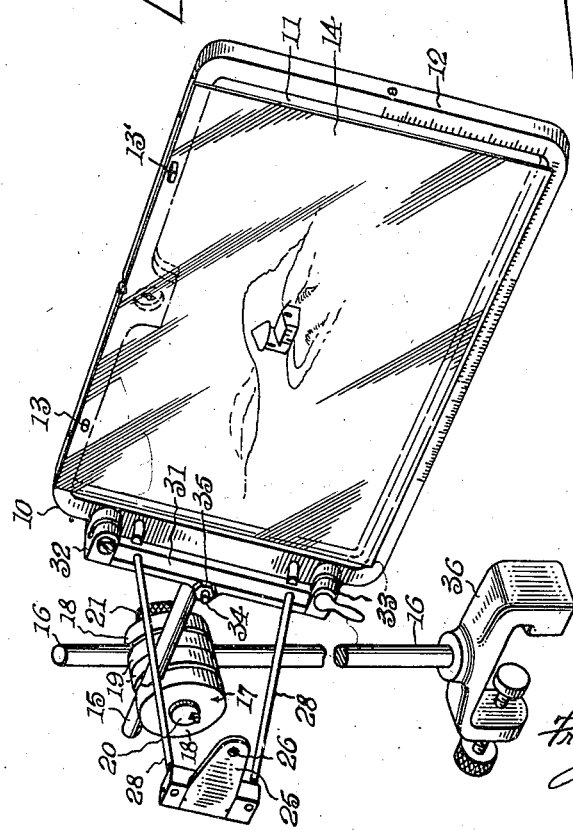
Inventor
Nathan H. Juran
Attorneys Nov. 5, 1946.　　　　N. H. JURAN　　　　2,410,447
SKETCHING DEVICE
Filed Oct. 30, 1944　　　　3 Sheets-Sheet 3

Inventor
Nathan H. Juran
By
Attorneys

Patented Nov. 5, 1946

2,410,447

UNITED STATES PATENT OFFICE 2,410,447

SKETCHING DEVICE

Nathan H. Juran, United States Navy, Hermosa Beach, Calif.

Application October 30, 1944, Serial No. 561,143

6 Claims. (Cl. 35—26)

(Granted under the act of March 3, 1883, as amended April 30, 1928; 370 O. G. 757)

The invention described herein may be manufactured and used by or for the Government for governmental purposes, without payment to me of any royalty thereon.

The present invention relates to improvements in sketching devices. It relates more particularly to a sketching device for the production of perspective views and can be used in preparing a plan from a perspective view and in producing a perspective view from a contour map.

In order to obtain an accurate perspective sketch of a subject such as the surrounding terrain, it has previously been necessary to have highly trained personnel, who are not always available, make such sketches. The present invention eliminates the need for such special skill and training and can be used by persons without special skill to produce an accurate perspective view of the desired subject. It is extremely valuable for military use as it is simple to use and is compact and readily transportable.

Another object of the present invention is to provide a novel device for preparing a perspective view, such as an airplane pilot would see, of a given location or area from a contour map. The device is extremely simple and such a view may be prepared quickly with a minimum of equipment. Other objects and advantages of the present invention will appear from the following description and the accompanying drawings in which:

Fig. 4 is a section view taken along the lines 4—4 of Fig. 1;

Fig. 5 illustrates the use of a sketching device incorporating the present invention in preparing a perspective view of surrounding terrain;

Fig. 8 illustrates, diagrammatically, the orientation of the sketching device for use as illustrated in Fig. 7.

Figure 1:
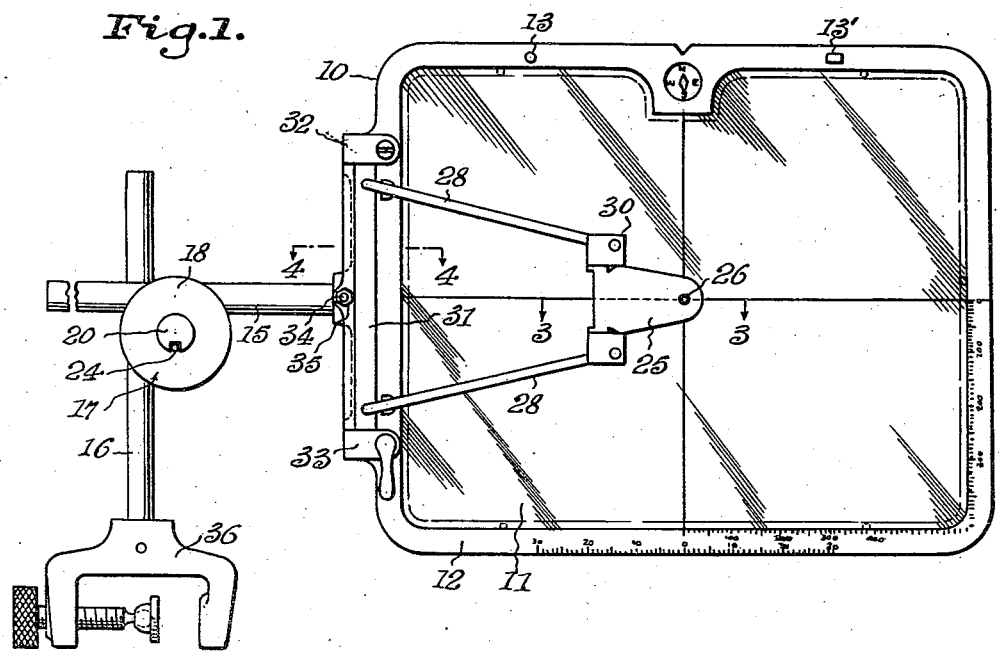
Fig. 1 is a plan view of a sketching device incorporating the invention.
Figure 2:
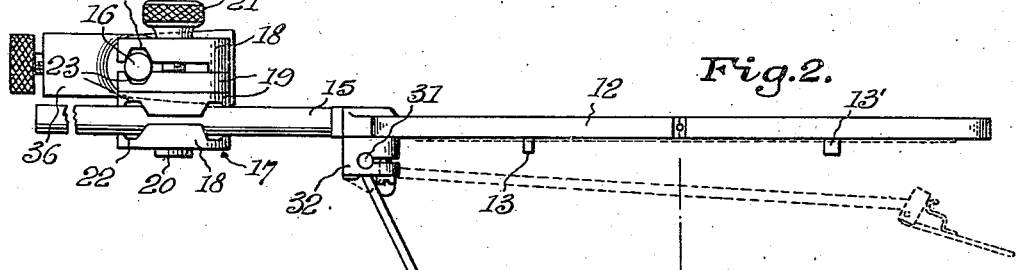
Fig. 2 is a side view of the sketching device shown in Fig. 1.

Referring to the drawings in detail, there is an easel 10 consisting of a pane 11 of transparent material surrounded by a metal frame 12. The pane 11 is preferably made of a non-frangible material such as "Lucite." If desired, standard grid markings may be engraved on the pane 11 and scales for various purposes may be engraved along the edges of the frame 12. Pins 13 and 13', located along the upper edge of the frame 12, engage with openings in a transparent sheet 14 to hold the sheet on the easel 10. The transparent sheet 14 is placed over the pane 11 of the easel in position to be drawn on. An acetate sheet treated to receive pencil markings is satisfactory.

A supporting arm 15 extends from one side of the frame 12. The supporting arm 15 is secured to a standard 16 by a universal connection 17. The universal connection 17 permits the easel 10 to be moved about the supporting standard 16 to any desired position. The universal connection 17 has two sets of grooved members 18 and 19 secured together by a headed shaft 20 and a locking nut 21. The grooved members 18 and 19 have channels 22 and 23, respectively, in their opposing faces. The channels 22 and 23 in the respective sets of the members 18 and 19 are placed opposite each other and form openings therein, one of which receives the arm 15 and the other of which receives the standard 16. The member 18, adjacent the headed end of the shaft 20, is keyed to the shaft 20 by the pin 24, to hold the shaft against rotation when the locking nut 21 is tightened. When the locking nut 21 is loose, the universal connection 17 may be moved along the standard 16 or along the arm 15 as desired.

A pinhole viewing tab 25 is normally held in spaced relation with and generally parallel to the easel 10 by a pair of supporting arms 28 which are secured to the frame 12. The viewing tab 25 has an aperture 26 approximately the size of a pinhole which is preferably located on a line perpendicular to the center of the easel 10 when the viewing tab is in position for use. As illustrated in Fig. 5, the easel 10 is located between the viewing tab 25 and the subject to be drawn so that the subject will be projected by the eye of an observer onto the transparent easel 10. The pinhole aperture 26 provides a depth of focus sufficient for bringing both the surface of the easel 10 and the subject, which may be at some distance, into sharp focus at the same time. This permits accurate reproduction of the subject to be made by merely drawing the subject as seen on the easel 10.

The viewing tab 25 is mounted on a shaft 27 which extends between the ends of the supporting arms 28. The viewing tab 25 is held in position, when in use, by a spring finger 29 on its rear face which engages with a stop 30 carried between the ends supporting arms 28.

The supporting arms 28 are secured to a bar 31 which is rotatably held to the frame 12 by clamps 32 and 33. A stud 34 is threaded through the bar 31 and strikes the frame 12 when the supporting arms 28 are raised. The pinhole aperture 26 may be aligned laterally with the center of the easel when the arms 28 are raised by adjustment of the stud 34. When the aperture 26 is properly aligned, the stud 34 is secured in place by a locking nut 35.

A clamp 36 is provided at the lower end of the standard 16 for securing the device to a convenient support such as a fence post or the like. For interior use a stand 40 may be substituted for the clamp 36 and the standard 16 will preferably be calibrated in units of length.

Figure 3:
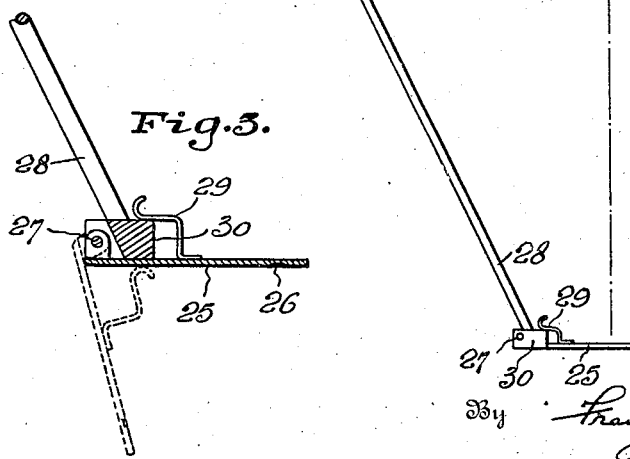
Fig. 3 is a section view taken along the lines 3—3 of Fig. 1.

When the device is not in use, the spring finger 29 is disengaged from the stop 30 and the viewing tab 25 and the supporting arms 28 may be collapsed to the positions illustrated by the dotted lines in Fig. 3. When so arranged the device is very compact and takes up a minimum of space so that it may be readily transported.

The preparation of a perspective of a given subject is illustrated by Fig. 5. The instrument is clamped to a suitable support and with the locking nut 21 on the universal connection 17 loose, the easel 10 and the viewing tab 25 are placed so that the desired view of the subject will be centered on the easel 10 when viewed through the pinhole aperture 26. The instrument is then fixed in this position by tightening the lock-nut 21 on the universal connection 17. The subject as seen on the easel 10 is then traced on the transparent sheet 14. The resulting drawing will be a true perspective of the subject.

Figure 6:
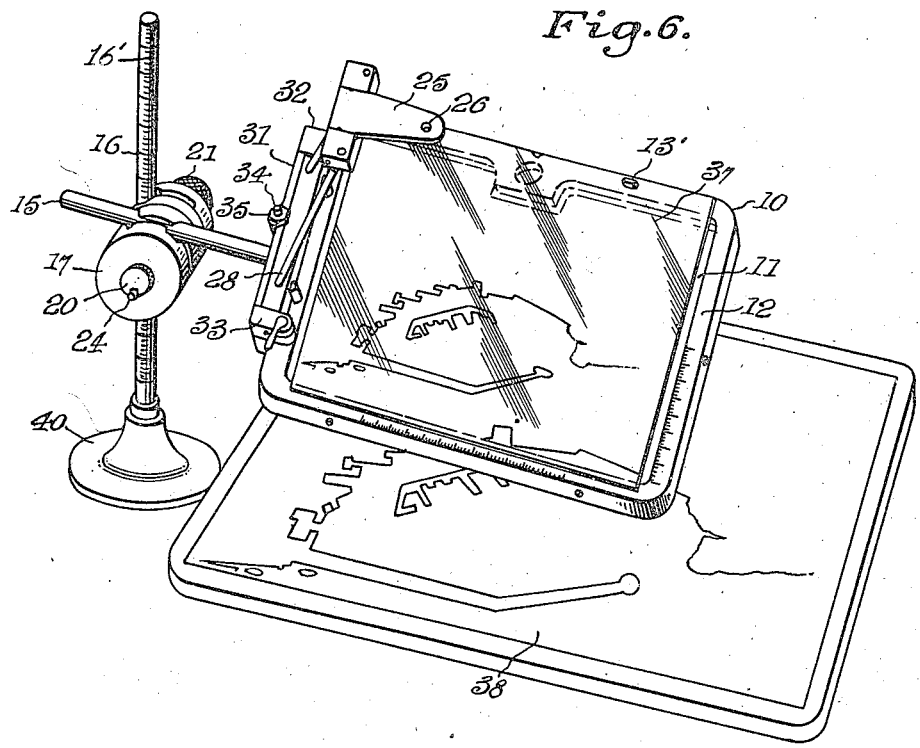
Fig. 6 illustrates the use of the device in drawing a plan or map of an area from a perspective view of the area.

From a perspective sketch of flat terrain or of terrain that has a constant slope, a true plan or map may be prepared in the manner illustrated in Fig. 6. A perspective sketch on a transparent sheet 37 is mounted on the easel 10 and the instrument is adjusted so that the easel will have the same tip and tilt with respect to a drawing board 38 that it had with respect to the subject at the time the original sketch was made. This tip and tilt may be known or may be determined as for example by aligning three or more points, preferably at the same elevation, that have already been located on the proposed plan view with the same points as projected from the perspective view. The perspective should have a focal length corresponding to the distance between the viewing tab 25 and the easel 10.

When the instrument has been properly aligned, the projection of the perspective on the drawing board 38 is traced. The projection of the perspective may be made by eye when the perspective is viewed through the pinhole viewing tab 25. If desired, a source of light approximately the size of a pinpoint may be placed at the location of the pinhole aperture 26 in the viewing tab 25 so that the light rays emanating from the pinpoint source will project the perspective on the drawing board 38.

Figure 7:
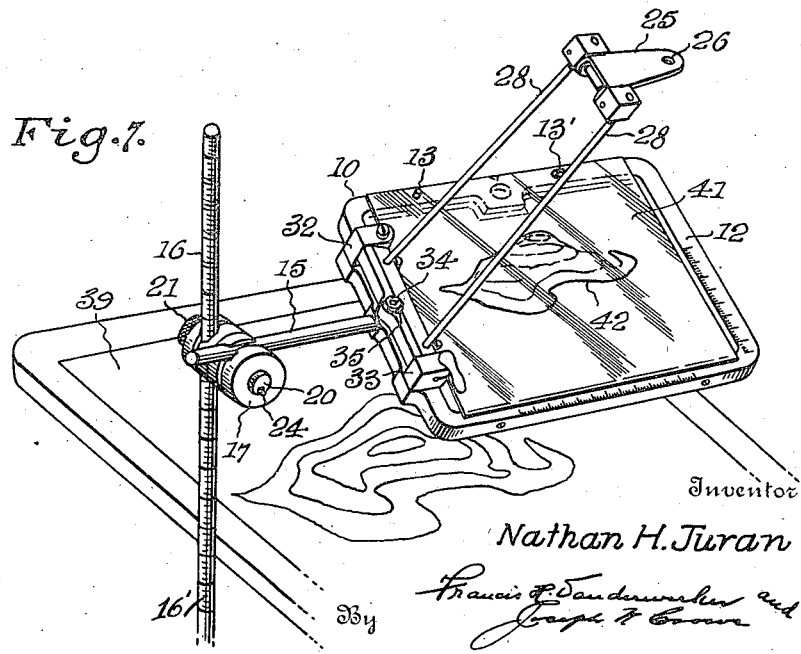
Fig. 7 illustrates the use of the device in drawing a perspective view of a subject from a contour map of the subject.

A perspective view of a given area may be prepared from a contour map of the area in the manner illustrated in Figs. 7 and 8. The direction, the distance and height from which the area is to be viewed are determined in advance.

A contour map 39 is placed on a flat surface and the sketching device is oriented in relation thereto in the following manner. As illustrated in Fig. 8, a line A is drawn on the map and the surface upon which it is disposed, said line representing the predetermined direction of approach. The sketching device is then placed along the line A and positioned so that an imaginary line extending between the pinhole aperture 26 and the center of the easel 10 will lie directly over the direction line A. The sketching device is located on the line A at the distance D from which the area is to be viewed. This distance is measured at the scale of the map from the center of the area to be viewed to a point directly below the pinhole aperture 26.

The pinhole aperture 26 is then set at the height H from a selected contour line, measured at the scale of the map, from which the area will be viewed. The sketching instrument is then adjusted so that the area to be viewed will be centrally located on the easel 10 when viewed through the pinhole aperture 26 of the viewing tab 25. When the above adjustments have been made, the aperture 26 will be in the same relation to the map 39 as a pilot will be to the actual area when approaching it from the direction and height indicated.

When the sketching device has been oriented in this manner, the selected contour line as viewed through the viewing tab 25 is traced on a transparent sheet 41 which is held on the easel 10. After the selected contour line has been traced, the height of the sketching device is then adjusted by an amount equal to the contour interval of the map and the corresponding contour line is traced on the easel 10. In order to make it more convenient in adjusting the height of the sketching device the supporting standard 16 may be provided with a scale 16' calibrated in units of length as shown in Figs. 6 and 7. This process is continued until all of the contour lines have been traced on the transparent sheet 41. To complete the perspective it will only be necessary to connect the edges of the contours with a line 42 which forms a silhouette of the subject.

Where it is apparent that the reverse or "backside" of the contour line will not be visible at the height and distance from which the area is to be viewed, it will not be necessary to draw that portion of the contour line. In such cases the perspective outline of the area is completed by connecting the extremities of the contour lines in the manner previously described.

By the method just described, a perspective of a building may be made from the architectural plans. In such a case the successive floor plans will correspond to the contours and the height adjustment will be based on the distance between floors.

While preferred embodiments of the invention have been shown and described herein, it will be apparent to those skilled in the art that various alterations and changes may be made without departing from the scope of the invention as defined by the appended claims.

I claim:

1. A collapsible sketching device comprising an easel having a transparent pane, an apertured viewing tab adjustably mounted on said easel, said viewing tab adapted to be actuated in a manner such that the viewing tab is brought into spaced, parallel relation with the easel and at the same time centering said aperture of said viewing tab with the center of the easel, and means to support the easel and viewing tab in a desired position comprising a supporting standard, a supporting arm attached to the easel, and a universal connection between the supporting standard and the supporting arm.

2. A collapsible sketching device comprising an easel having a transparent pane, an apertured viewing tab adjustably mounted on said easel, said viewing tab adapted to be actuated in a manner such that the viewing tab is brought into spaced parallel relation with the easel, means for detachably holding the viewing tab in spaced, parallel relation with said easel, with the aperture of said viewing tab centered with the center of said easel and means to support the easel and viewing tab in a desired position comprising a supporting standard having a scale thereon graduated in units of length, a supporting arm attached to the easel and a universal connection between the supporting standard and the supporting arm.

3. A collapsible sketching device including an easel having a transparent pane, a viewing tab support movably mounted on said easel and an apertured viewing tab mounted on said support, said support adapted to be actuated about said easel to bring the viewing tab in spaced, parallel relation with said easel and simultaneously align the aperture of said viewing tab with the center of said easel.

4. A collapsible sketching device including an easel having a transparent pane, a viewing tab support movably mounted on said easel and an apertured viewing tab mounted on said support, said support adapted to be actuated about said easel to bring the viewing tab in spaced, parallel relation with said easel and simultaneously align the aperture of said viewing tab with the center of said easel, and means for detachably locking said support in position for holding the aperture of said viewing tab in alignment with the center of said easel.

5. A collapsible sketching device including an easel having a transparent pane, a viewing tab support movably mounted on said easel, an apertured viewing tab movably mounted on said support, means for detachably holding said viewing tab in a fixed position on said support, said support adapted to be actuated to bring the viewing tab in spaced, parallel relation with said easel, and means for detachably locking said support in position for holding said aperture of the viewing tab in alignment with the center of said easel.

6. A collapsible sketching device including an easel having a transparent pane, a viewing tab support movably mounted on said easel, an apertured viewing tab movably mounted on said support, means including a spring finger for detachably holding said viewing tab in a fixed position on said support, said support adapted to be actuated to bring the viewing tab in spaced, parallel relation with said easel, and means including clamps for detachably locking said support in position for holding said aperture of the viewing tab in alignment with the center of said easel.

NATHAN H. JURAN.